UNITED STATES PATENT OFFICE.

HENRY SCHNEIDER, OF CLEVELAND, OHIO.

IMPROVED CEMENT FOR STONE.

Specification forming part of Letters Patent No. 51,867, dated January 2, 1866.

*To all whom it may concern:*

Be it known that I, HENRY SCHNEIDER, of Cleveland, in the county of Cuyahoga and State of Ohio, have invented certain new and useful Improvements in Stone-Cement; and I do hereby declare that the following is a full and complete description of the same.

The nature of my improvement relates to a cement or composition of sulphate of lime, calcined, iron filings, and fine chips of cast-iron, pulverized together, to which is added beer, glue-water, and white of egg in equal proportions and in such quantities as to make the compound about the consistency of putty, which makes a strong and durable cement for the purpose hereinafter set forth, and which may be compounded as follows: I take six-eighths of sulphate of lime, calcined, and one-eighth iron filings, or cast-iron fine chips, and mix together by pulverizing them finely in a mortar. Then, in equal proportions, beer, glue-water, and the white of egg is added, as desired, so as to make the compound about the consistency of putty. At the same time the filings are mixed one-eighth of sand is added. This sand is essential in outside and stone work. In stone-work the same material is pulverized into a sand and then mixed with the compound, which makes it the same color as the work in which it is to be used; and in brick-work the same course may be taken, so that the color of the cement and structure will be alike. In the same way any color may be given to the cement, as the nature of the work may require. The liquids combined make a stronger cement than when one of them is used separately.

In case either one of the liquids are added separately, the beer compound sets in about five hours, glue-water in ten, and egg about the same. The glue-water allows the work to be handled a longer time in setting without injury to the cement than when beer is used alone. Either beer, glue-water, or white of egg makes a stronger cement than water.

In case a light-colored cement is needed the white of egg is used, as the beer and glue-water tends to give a darker shade.

This cement is for making joints in work, for fastening brackets and railings, frames, doors, hinges, and balcony-work, or may be used in either wood, stone, metal, or brick, as is desired.

The relative proportions of the ingredients may be varied without changing the nature of my improvement.

What I claim as my improvement, and desire to secure by Letters Patent, is—

The cement herein set forth, when compounded and composed of the ingredients described.

HENRY SCHNEIDER.

Witnesses:
W. H. BURRIDGE,
J. HOLMES.